(12) United States Patent
Wysocki

(10) Patent No.: US 9,517,578 B2
(45) Date of Patent: Dec. 13, 2016

(54) METHOD FOR MANUFACTURING BIODEGRADABLE MOLDINGS IN PARTICULAR TABLEWARE AND PACKAGES

(71) Applicant: ASTON INVESTMENT SPOLKA Z OGRANICZONA ODPOWIEDZIALNOSCIA, Zambrow (PL)

(72) Inventor: Jerzy Wysocki, Warsaw (PL)

(73) Assignee: ASTON INVESTMENT SPOLKA Z OGRANICZONA ODPOWIEDZIANLNOSCIA, Zambrow (PL)

( * ) Notice: Subject to any disclaimer, the term of this patent is extended or adjusted under 35 U.S.C. 154(b) by 0 days.

(21) Appl. No.: 14/672,872

(22) Filed: Mar. 30, 2015

(65) Prior Publication Data
US 2015/0224682 A1    Aug. 13, 2015

Related U.S. Application Data

(63) Continuation-in-part of application No. PCT/PL2013/000123, filed on Sep. 27, 2013.

(30) Foreign Application Priority Data

Sep. 28, 2012    (PL) .......................................... 400981

(51) Int. Cl.
| | | |
|---|---|---|
| *B29C 35/04* | (2006.01) | |
| *A47G 19/03* | (2006.01) | |
| *A47G 21/00* | (2006.01) | |
| *D21J 1/00* | (2006.01) | |
| *D21J 3/00* | (2006.01) | |

(52) U.S. Cl.
CPC ............ *B29C 35/049* (2013.01); *A47G 21/00* (2013.01); *D21J 1/00* (2013.01); *D21J 3/00* (2013.01)

(58) Field of Classification Search
None
See application file for complete search history.

(56) References Cited

U.S. PATENT DOCUMENTS

2003/0068427 A1*  4/2003  Wysocki ................ A21C 11/00
                                                               426/615

FOREIGN PATENT DOCUMENTS

| DE | 39 37 168 | 5/1991 |
|---|---|---|
| EP | 0 474 095 | 3/1992 |
| EP | 0 692 357 | 1/1996 |

* cited by examiner

*Primary Examiner* — Mary F Theisen
(74) *Attorney, Agent, or Firm* — Vedder Price P.C.; Thomas J. Kowalski; Deborah L. Lu

(57) ABSTRACT

Method for manufacturing biodegradable moldings, in particular tableware and packages, with application of the method of evoking the water vapor pressure inside the mold consists in that loose bran, preferably the wheat bran, of granulation from 0.01 up to 2.80 mm in the amount of 95-100% of weight containing more than 14% of water structurally bound in the form of moisture, if needed, is mixed in the dry form with additional substances in the amount of up to 5% of weight in total, and the measured amount of dry material obtained in that way is placed in one of the parts of multipart mold, then the mold is closed and the mixture is subject to the simultaneous operation of temperature and pressure of the scope 1-10 MPa. The mold is heated up to temperature above 120° C., then the mold is closed, and then is depressurized, thus forming a gap between the edges of the mold not wider than 0.5 mm, and then the mold, if needed, is closed again, and the depressurization cycles are repeated. After the last cycle the mold is opened and the number of depressurizations is at least 1, and the entire process of depressurization and closing the mold takes a few seconds and is completed according to the program of the machinery digitally controlling the mold movement depending on the expected parameters of the final product.

5 Claims, No Drawings

METHOD FOR MANUFACTURING BIODEGRADABLE MOLDINGS IN PARTICULAR TABLEWARE AND PACKAGES

RELATED APPLICATIONS AND INCORPORATION BY REFERENCE

This application is a continuation-in-part application of international patent application Serial No. PCT/PL2013/000123 filed 27 Sep. 2013, which published as PCT Publication No. WO 2014/051447 on 3 Apr. 2014, which claims benefit of Polish patent application Serial No. P.400981 filed 28 Sep. 2012.

The foregoing applications, and all documents cited therein or during their prosecution ("appln cited documents") and all documents cited or referenced in the appln cited documents, and all documents cited or referenced herein ("herein cited documents"), and all documents cited or referenced in herein cited documents, together with any manufacturer's instructions, descriptions, product specifications, and product sheets for any products mentioned herein or in any document incorporated by reference herein, are hereby incorporated herein by reference, and may be employed in the practice of the invention. More specifically, all referenced documents are incorporated by reference to the same extent as if each individual document was specifically and individually indicated to be incorporated by reference.

FIELD OF THE INVENTION

The object of the invention is a method for manufacturing biodegradable moldings, in particular tableware and packages.

BACKGROUND OF THE INVENTION

A method for manufacturing biodegradable moldings, in particular tableware and packages, is known under the Polish patent specification PL 195130.

Citation or identification of any document in this application is not an admission that such document is available as prior art to the present invention.

SUMMARY OF THE INVENTION

The present invention involves a method for manufacturing biodegradable moldings, in particular tableware and packages, with application of the method of evoking the water vapor pressure inside the mold, involving mixing loose bran, preferably the wheat bran, of granulation from 0.01 up to 2.80 mm in the amount of 95-100% of weight containing more than 14% of water structurally bound in the form of moisture, if needed, in the dry form with the mixture of impregnating substances and/or flavor and/or fragrance additives and/or non-fibrous fillers and/or humectants and/or colorants in the amount of up to 5% of weight along with the measured amount of the loose material obtained in that way is placed in one of the parts of the multipart, preferably two part, mold, then the mold is closed and the mixture is subject to the simultaneous operation of temperature and pressure in the scope of 1-10 MPa, characterised by the fact that the mold is heated up to the temperature higher than 120° C., and then the mold is closed, and then depressurised, forming a gap between the edges of the mold not wider than 0.5 mm, and then the mold, if needed, is closed again, and the cycles of depressurisation are repeated, and then after the last cycle the mold is opened provided, wherein the number of depressurisations is at least 1 and the entire process of depressurisation and closing of the mold takes a few seconds and is carried out according the program of the machinery digitally controlling the mold movement depending on the expected parameters of the final product.

Accordingly, it is an object of the invention not to encompass within the invention any previously known product, process of making the product, or method of using the product such that Applicants reserve the right and hereby disclose a disclaimer of any previously known product, process, or method. It is further noted that the invention does not intend to encompass within the scope of the invention any product, process, or making of the product or method of using the product, which does not meet the written description and enablement requirements of the USPTO (35 U.S.C. §112, first paragraph) or the EPO (Article 83 of the EPC), such that Applicants reserve the right and hereby disclose a disclaimer of any previously described product, process of making the product, or method of using the product. It may be advantageous in the practice of the invention to be in compliance with Art. 53(c) EPC and Rule 28(b) and (c) EPC. Nothing herein is to be construed as a promise.

It is noted that in this disclosure and particularly in the claims and/or paragraphs, terms such as "comprises", "comprised", "comprising" and the like can have the meaning attributed to it in U.S. patent law; e.g., they can mean "includes", "included", "including", and the like; and that terms such as "consisting essentially of" and "consists essentially of" have the meaning ascribed to them in U.S. patent law, e.g., they allow for elements not explicitly recited, but exclude elements that are found in the prior art or that affect a basic or novel characteristic of the invention.

These and other embodiments are disclosed or are obvious from and encompassed by, the following Detailed Description.

DETAILED DESCRIPTION OF THE INVENTION

The method involves that loose bran, preferably the wheat bran, of the granulation from 0.01 to 2.80 mm in the amount of 95-100% of weight containing from 7% to 45% of water structurally bound in the form of moisture, if needed, is mixed in the dry form with the mixture of the impregnating substances and/or flavor and/or fragrance additives and/or the non-fibrous fillers and/or humectants and/or coloring additives in the amount of 5% of weight collectively. The measured amount of the loose material obtained in the above described manner is placed in one part of the multipart, preferably, two-piece mold and then the mold is closed and the mixture is submitted to the simultaneous operation of temperature in the scope from 20 to 450° C. and pressure in the scope of 1-10 MPa and/or the force up to 100 t/cm$^2$ with the piston pressure up to 320 MPa during the time of up to several seconds. In the case of pressure application, the method of the invention is preferably carried out as follows: the mold before full closure is sealed and then presses the second part of the mold to produce pressure within the mold. The use of force is preferably accomplished by the use of hydraulic presses, mechanical presses, hydraulic hammer or equipment specially designed for this purpose. All parts of the mold are heated up whereby the upper and lower parts of the mold should be heated up to different temperatures thus enabling the control of the formed water vapor's flow. This effect allows choosing which surface of the molding is to be less porous. Total time of submitting the mixture to the operation of pressure or force and temperature being several seconds may be completed in one cycle or in several cycles of several seconds with the alternating load shedding.

The method according to the invention may be carried out in one cycle if the mold has holes, gaps or pores which enable the discharge of water vapor formed during the temperature and pressure or force operation. The finished products are preferably coated with the film-forming layer in any way.

Pursuant to the above method, two techniques are applied. The first one consists in submitting the matter contained in the mold to the repeated pressure with the piston of the hydraulic press. Each release of the piston opens the mold and releases the formed water vapor. The formation of the final product requires several piston strokes and the water vapor exiting abruptly from the partially liquefied mass causes tearing of the moldings. The loss accounts for as much as 50%. The ability to control the process and to monitor it is limited. In turn, the application of pressure by closing the mold, the sealing and operation of the pressure generated by the water vapor formed in the impenetrable mold does not allow for relaxation of the mass in the subsequent cycles. Not more than one cycle is applied as sealing the mold each time is not realistic from the technical and economic perspective. Application of the molds having pores or gaps, which allow water vapor's exit are applied in the method using the press piston pressure force.

The method according to the Polish patent description No PL 195130 is in practice applied for the flat molds such as plates in the version of applying the piston pressure force, and for the products having significant depth such as cups the method of the impenetrable closure of the mold and the process including one cycle are applied. In both cases the loss of the raw material resulting from the mass overflow from the mold, tearing of the moldings during an abrupt mold opening are significant. Additionally, the process is practically unpredictable and the formed moldings are not identical, do not have identical color and density. Forming one molding takes about several seconds, which influences quite low technological performance with the simultaneous significant amount of waste. In practice it is not possible to evoke high pressure inside the mold as it would cause the complete tear of the product and additionally tearing the product constitutes the threat for the persons staying close to the production line.

Forming the moldings according to the above described method is therefore very sensitive to the changes of all parameters such as pressure, temperature, raw material moisture, mold closing and opening times. Insignificant change of at least one of these parameters causes uncontrolled increase of pressure which tears the product during opening of the molds already in the first cycle. These parameters, however, are essential for the appearance, density and time of particular pressure as well as the control of the entire production process. The products are clear and having relatively small density thus they are flexible enough and absorb water easily. The products manufactured in the above described method are the effect of very delicate extrusion. At maximum, four moldings per minute can be produced.

The object of invention is the method of manufacturing biodegradable moldings, in particular the tableware and packages with application of the method of evoking water vapor's pressure inside the mold. Loose bran, preferably the wheat bran, of the granulation from 0.01 to 2.80 mm in the amount of 95-100% of weight containing more than 14% of the structurally bound water in the form of moisture, if needed, is mixed in the dry form with the mixture of the impregnating substances and/or flavor and/or fragrance additives and/or non-fibrous fillers and/or humectants and/or coloring additives in the amount of up to 5% of weight collectively. The measured amount of the loose material obtained in the above described manner is placed in one part of multipart, preferably two-piece, impenetrable heated mold, the mold is closed and the mixture is submitted to the simultaneous operation of temperature in the scope from 120° C. and pressure in the scope 1-10 MPa, then the mold is depressurised forming a gap between the edges of the mold which is not wider than 0.5 mm and then, if the needed, the mold is closed again and the depressurisation cycles are repeated, and then in the last cycle the mold is opened and the number of depressurisations is at least 1 and the entire process takes a few seconds. The process of depressurisation and closing the mold is carried out according to the program of the machinery which digitally controls the mold movement depending on the expected parameters of the final product. Due to the application of the impenetrable mold and not complete opening of the mold between the cycles it is possible to obtain the product of the physical and mechanical parameters which are assumed in advance and programmable as well as having specific color and appearance. The prior art solution with application of the pressure of the formed water vapor taking into account only one time and complete mold opening did not allow any control of the process. Currently offered method due to the stage of at least one mold depressurisation prior to its complete opening and the possibility of the repeated impenetrable closing of the mold and performing more than one cycle of the pressure operation enables to obtain the moldings having better operational parameters such as density, color and fragrance. It is possible to evoke high pressure without any distortions to the moldings and the production losses. The color, fragrance and density are particularly significant if the moldings are then applied as disposable tableware for serving food. This tableware after the end of the meal is suitable for consumption, therefore its taste and fragrance are important. The most important feature of the moldings obtained in the result of applying the method according to the invention is their increased density and significant decrease of the production loss. Density of the moldings influences their increased resistance to absorbing liquid, hot dishes, gravies and other liquids. Additionally, the moldings are stiffer and easier to hold by the consumer. The time of producing a single molding is also important and it decreased several times with simultaneous improvement of the operational parameters of the final product. Additionally, the method according to the invention allows the monitored control of the process in order to obtain the product of such parameters which is required for the specific purpose. Each depressurisation and closing cycle may result in different parameters, thus providing the possibility of producing the products having different parameters planned in advance such as: appearance, resistance features, water absorption and density. The new method allows production from the same mold shape, for example a bowl, of the products of different external and internal characteristics according to the planned production by regulating the time, temperature and number of depressurisations. It is possible to produce up to 20 moldings per minute in comparison to four according to the method known in the art.

Although the present invention and its advantages have been described in detail, it should be understood that various changes, substitutions and alterations can be made herein without departing from the spirit and scope of the invention as defined in the appended claims.

The present invention will be further illustrated in the following Examples which are given for illustration purposes only and are not intended to limit the invention in any way.

Example 1

From loose bran containing structurally bound moisture of 17.5% obtained from milling the wheat, the following cuts were selected by screening in the amounts of 0.1/0.2 mm-35% of weight, 0.2/0.4 mm-25% of weight, 0.4/0.8 mm-40% of weight. The material was prepared for forming biodegradable moldings by mixing 99% of weight of bran selected in the above manner with 0.3% of weight of sorbite, 0.4% of weight of burnt sugar and 0.3% of weight of the colorant admitted for application in the food products. The mold had two parts. The inner part of the mold reflected the shape of the final product and its edges touched each other by the system of tongues and groves tightly closing the mold. The mold heated up to 120° C. was poured with the prepared mixture of the weight higher by 10% than the weight of the final product and then closed. The heat, necessary for liquefying the mixture and evaporating water, was supplied to the inside of the molds. To obtain the required features of the product, it is necessary to achieve the moisture of 10-11%. When closing, the heat was supplied, and when depressurising, the water evaporation was allowed. In this case, 5 cycles of closing for 1 s each were applied and between the cycles the mold was depressurised each time for 0.5 second. The entire process of closing and depressurising was digitally controlled. The mold was depressurised within the limits from 0.1 mm up to 0.2 mm. The product was obtained having the density of 1.00 g/cm$^3$ while in the method known in the art, the moldings of the density up to 1.200 g/cm$^3$ were obtained.

Example 2

Bran mixture of 17.5% moisture.
Temperature 170° C.
The exact portion was measured (without overflow).
The procedure is the same as in the example 1 in order to obtain the ready product of 11% moisture.
The mold is closed and the edges are closed before the complete liquefaction.
High temperature with the complete pressure causes an abrupt increase of pressure inside, the material easily obtains high level of liquidity and absorbs temperature necessary for evaporating water. In this method, water in the material after liquefying achieves the temperature of boiling only by the end of the first closing. Closing and opening of the first cycle takes about 3 seconds and is digitally controlled. The second closing causes similar effects as the first but the material is already liquid and high pressure and temperature influence the density of the ready product. Practically, after the second pressure, the product achieves 11-12% of moisture and the process can be finished. For the appearance and shine, the third pressure is applied but only for the cosmetic purposes and energy applied in this pressure is insignificant. The first closure 1.5 s, the first depressurisation—1.0 s, the repeated closure—2 s, the repeated depressurisation—1 s, the repeated closure 1 s, depressurisation 0.5 s. The product of density 1.600 g/cm$^3$ was obtained while by the method known in the art the moldings of density up to 1.200 g/cm$^3$ are obtained and the production time takes more than 30 s.

Example 3

Bran mixture of the moisture 17.5%.
Temperature 190-200° C.
The exact portion in the closed mold and the procedure is the same as in the example 2 in which the objective is the ready product of the moisture of 11%. The molds are closed and even higher temperature and pressure cause easy liquefying. After 5 s, the mold is depressurised for 2 s and then opened. The product of density 1.400 g/cm$^3$ is obtained while with the method known in the art, the moldings of density of up to 1.200 g/cm$^3$ are obtained and the production time takes more than 30 s.

The achieved moisture of ca. 10-11% depending on the number of the mold closures and temperature is illustrated in Table 1.

TABLE 1

|  | Mold temperature | | |
| --- | --- | --- | --- |
| Number of closures | 120° C. | 170° C. | 190° C. |
| 1 | 16.5 | 15.9 | 11.3 |
| 2 | 14.1 | 13.8 | 10.2 |
| 3 | 13.2 | 12.2 |  |
| 4 | 11.8 | 11.1 |  |
| 5 | 10.9 | 9.9 |  |

Stable raw material moisture at the level of 17.5%

In the above examples the bowls of the diameter of 200 mm and the plates of the diameter of 240 mm were manufactured. The study of absorption of water of 20° C. and oil and inflow of water of the boiling temperature are presented in the Table 2. The study consisted in filling the bowl and the plate and measuring the time until the leak track appeared. The results of all measurements indicated two or even threefold higher resistance to leaks in relation to the plates and bowls manufactured in the preceding method. The study indicated that high pressure in the course of the production results in the high density products and it has the decisive influence on the water absorption of the ready products. The final cycles according to the invention are only the cosmetic ones and improve the appearance.

TABLE 2

Statement of the characteristic feature of the products obtained according to the prior art and the method according to the invention

| Product | Rigidity MPA | Density G/cm$^3$ | Thickness mm | Weight g | Color | Fragrance | Number of production cycles |
| --- | --- | --- | --- | --- | --- | --- | --- |
| Bowl 20 cm | 1100 | 1.100 | 1.6 | 45-50 | Light | Bran | 5 |
| *Bowl 20 cm | 1650 | 1.550 | 1.6 | 57-62 | Light brown natural gloss | Roasted bran | 3 |

TABLE 2-continued

Statement of the characteristic feature of the products obtained according to the prior art and the method according to the invention

| Product | Rigidity MPA | Density G/cm³ | Thickness mm | Weight g | Color | Fragrance | Number of production cycles |
|---|---|---|---|---|---|---|---|
| Plate 24 cm | 980 | 1.180 | 1.8 | 80-90 | Light brown | Bran | 5 |
| *Plate 24 cm | 1400 | 1.600 | 1.8 | 95-100 | Dark brown natural gloss | Crusts | 3 |

*Relates to the method according to the invention

Having thus described in detail preferred embodiments of the present invention, it is to be understood that the invention defined by the above paragraphs is not to be limited to particular details set forth in the above description as many apparent variations thereof are possible without departing from the spirit or scope of the present invention.

What is claimed is:

1. A method for manufacturing biodegradable moldings with application of the method of evoking water vapor pressure inside the mold comprising the following steps
   (a) mixing loose bran, of granulation from 0.01 up to 2.80 mm in the amount of 95-100% of weight containing more than 14% of water structurally bound in the form of moisture, to obtain the loose material;
   (b) heating the mold to temperature higher than 120° C.;
   (c) placing in one of the parts of the multipart mold measured amount of the loose material obtained in (a);
   (d) closing the mold and subjecting the mixture of bran to a simultaneous operation of temperature and pressure in the scope of about 1-10 MPa;
   (e) depressurizing the mixture without complete opening of the mold by forming a gap between the edges of the mold not wider than 0.5 mm, wherein the depressurizing is performed at least one time;
   (f) optionally closing the mold and repeating steps (d), (e), and/or (f),
   wherein each step (d) lasts 1-2 seconds and each step (e) lasts 0.5-1 second, and the entire process of closing (d) and depressurizing (e) takes a few seconds and is carried out according the program of the machinery digitally controlling the mold movement depending on the expected parameters of the final product; and
   (h) opening the mold after the last cycle,
   thereby manufacturing biodegradable moldings having a density of at least 1.400 g/cm³.

2. The method of claim 1, wherein the loose bran is mixed in a dry form with a mixture of impregnating substances and/or flavor and/or fragrance additives and/or non-fibrous fillers and/or humectants and/or colorants in the amount of up to 5% of weight to obtain the loose material.

3. The method of claim 1, wherein the biodegradable moldings are tableware and packages.

4. The method of claim 1, wherein the loose bran is wheat bran.

5. The method of claim 1, wherein the mold is a two part mold.

* * * * *